UNITED STATES PATENT OFFICE.

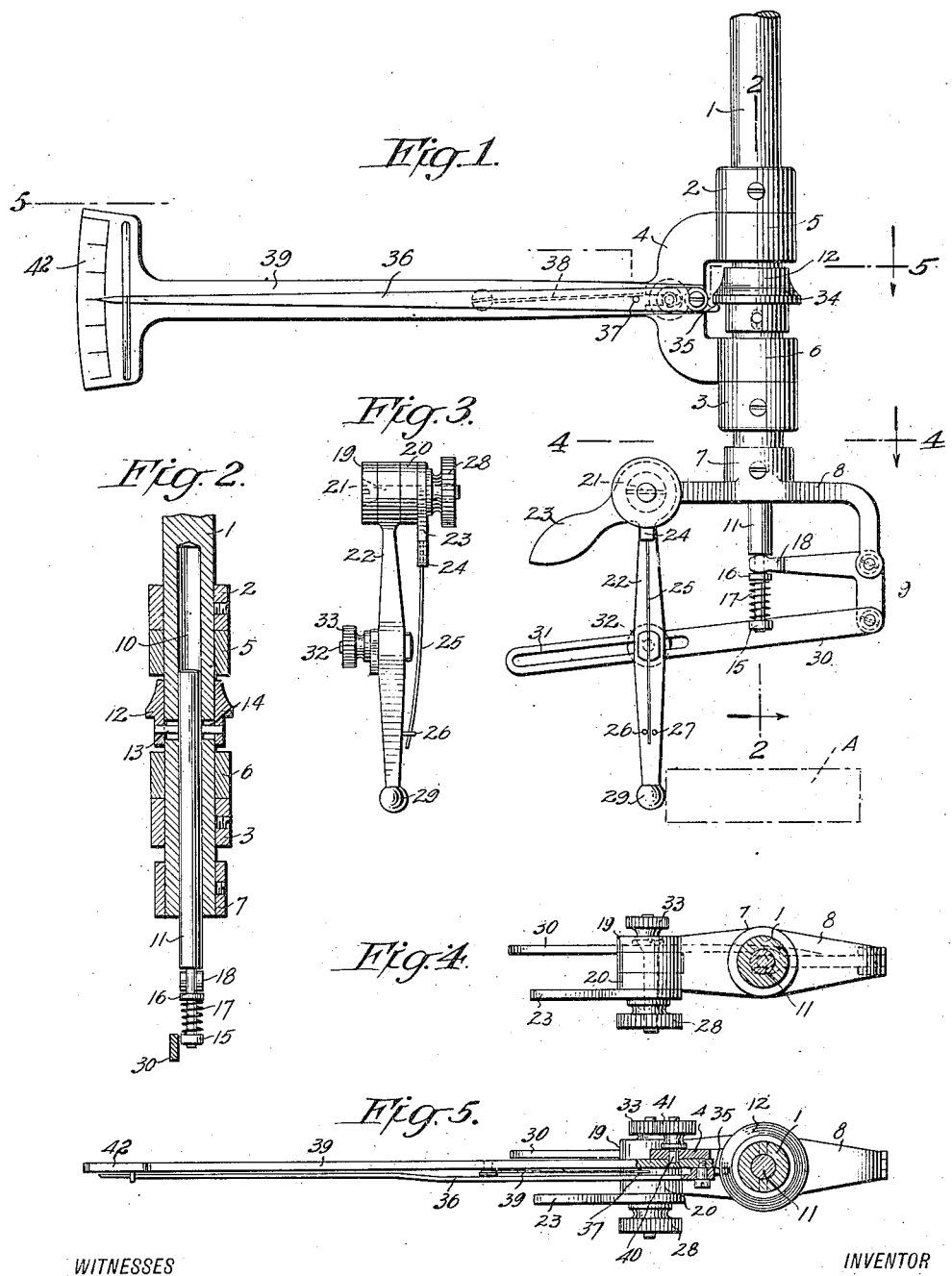

ALFRED FELIX FERRAND, OF NEW BRUNSWICK, NEW JERSEY.

INDICATOR.

1,373,319.  Specification of Letters Patent.  Patented Mar. 29, 1921.

Application filed June 16, 1920. Serial No. 389,415.

*To all whom it may concern:*

Be it known that I, ALFRED F. FERRAND, a citizen of France, and a resident of New Brunswick, in the county of Middlesex and State of New Jersey, have invented a new and Improved Indicator, of which the following is a full, clear, and exact description.

This invention relates to indicators, and has particular reference to one which is used in connection with metal-working machinery, such as milling machines, boring machines, and the like, to facilitate the lining up of the work with respect to a tool-holding device, and to readily indicate during the lining-up process the degree of eccentricity of the work with respect to the tool holder.

An object of the invention is to provide a device which may be readily attached to the usual rotating tool spindle in a metal-working machine and which, by contacting with the work which is mounted in a stationary chuck, will indicate the amount by which the work is off center in the chuck with respect to the tool spindle.

Another object is to provide a device in which certain parts thereof are adapted to rotate around the work, contact at the same time therewith, and produce an indication on a dial or other device, which indicating dial and its correlated parts are adapted to remain stationary while the remaining portions of the device are rotating, thus enabling the machinist at all times to easily read the indications.

A further object is to provide a device whereby work to be treated, and which is mounted in an adjustable chuck or work holder, can be readily lined up with the tool spindle of the machine by reference to a hole in the work which is to be rebored, or by reference to a boss on the work in which a hole is to be bored.

In the general type of machine with which this tool is adapted to be used, there is generally a head stock carrying a rotatable tool holder or spindle. The work, such as the casting to be bored or having a hole therein which is to be rebored, or a circular piece of the metal which is to have a central hole placed therein, is placed in the chuck or adjustable work holder on a tail stock. It becomes necessary, in order to accurately bore or otherwise treat the work, that the particular point of the work to be treated, such as the location of a hole to be drilled or the centering of an aperture to be reamed or rebored, should be accurately centered with respect to the axis of the tool spindle.

To this end, my device comprises a shank or shaft which may be readily inserted in the tool spindle. This shank or shaft carries a projecting arm thereon which is adapted, during the rotation of the shank in the tool spindle, to contact with the edges of the work, such as the interior surface of a bore or the outer rim of a circular casting. If the work with which the above-mentioned arm is adapted to contact is off center, this eccentricity is adapted to cause a lateral movement of the arm and, through a suitable system of levers, to produce movement in an indicator arm which is so connected with the rotating portion of the device as to produce an indication while remaining stationary. By so remaining stationary, this indicator provides simple means whereby the operator can readily perceive, during the process of centering the work, the degree by which the work is off center.

The invention more in detail comprises a rotatable shaft carrying a projecting arm adapted to contact with the work. By this arm suitable linkage is connected to an inner reciprocable rod within the rotating shaft, which rod is connected to a sliding collar on the shaft, and by movement therein, produced through the medium of the above-mentioned work-contact arm, a stationary indicator arm in sliding contact with the collar is caused to move and indicate on a dial.

The invention more specifically comprises the particular arrangement and construction of the parts which will hereinafter be set forth more in detail in the following specification and claim.

The invention is illustrated in the drawing, of which—

Figure 1 represents an elevation of the device;

Fig. 2 represents a partial, longitudinal section through the main shaft;

Fig. 3 represents a side elevation of the lower portion of the device;

Fig. 4 represents a sectional view taken on the line 4—4 of Fig. 1; and

Fig. 5 represents a sectional view taken on the line 5—5 of Fig. 1.

As shown in the drawing, the device which embodies my invention comprises a shaft or shank 1 which is adapted to be inserted in the spindle of a boring or drilling or other similar machine. If the spindle is provided with a taper, a suitable socket may be provided with the shank, having an exterior taper corresponding to the taper of the spindle. To this shaft 1 are fixed spaced collars 2 and 3 which are adapted to fix the position on shaft 1 of a yoke member 4 which has collar portions 5 and 6 loosely embracing the shaft 1. At one end of the shaft 1 there is provided a fixed collar 7 to which is attached a curved crosspiece 8. To one end of the crosspiece 8 a bell crank lever 9 is pivoted.

The shank 1 is provided with an inner bore 10 within which a rod 11 is adapted to have a certain limited movement. One end of this rod 11 is pinned to a collar 12 which is adapted to have a slight amount of sliding movement along the shank 1. A pin 13 extends into and is adapted to move in a slot 14 in the shank 1. The other end of the rod 11 is reduced in diameter, and at its outer end is provided with a head nut 15 and a sliding collar 16 between which is located a spring 17. Above the sliding collar 16 the reduced portion of the rod 11 is embraced by one end 18 of the bell crank lever 9.

The other end of the crosspiece 8 is in the form of a yoke, the portions 19 and 20 of which provide bearings for a shaft 21 on which is loosely mounted an arm 22. An outer end of the shaft 21 is threaded and is adapted to be loosely embraced by another arm 23 from a projecting portion 24 of which a spring 25 is adapted to extend. This spring 25 at its outer end is positioned between suitable pins 26 and 27 on the outer end of arm 22. The position of the spring-holding arm 23 with respect to the shaft 21 is adjusted by means of a thumb screw nut 28, which can be tightened against the face of arm 23 to hold it in any desired angular position with respect to shaft 21 and thereby determine the pressure of the spring 25 on the arm 22. This arm 22 at its outer end is provided with a contact ball 29 which is adapted to contact with portions of the work, which is shown in dotted lines and represented by the letter A.

At the other end of the bell crank lever 9, a lever 30 is pivoted, which, at its outer end is provided with a slot 31. A threaded pin 32, extending from the arm 22 through the slot 31, has on its outer end a thumb nut 33 which may be tightened thereon to fix the position of the arm 22 with respect to the slot 31.

The collar 12 is provided with a shoulder 34 against which a projecting finger 35, at one end of a pivoted lever 36, is adapted to bear. This lever 36 is pivotally mounted on a stationary bar 39 one end of which is adapted to be inserted in a slot in the yoke 4 and to be fastened in said slot by means of a screw bolt 40 having a thumb nut 41. The lever 36 is provided with a pin 37 against which a spring 38, on the bar portion 39, bears and tends to hold the projecting finger 35 against the lower face of the shoulder 34. The bar 39 is provided at its outer end with a dial face 42 on which may be marked indications capable of being calibrated to represent, in suitable terms, the degree of movement of the ball 29 with respect to the other parts of the mechanism.

In the operation of the device, the shaft 1 is fastened in the spindle of the machine. The work having been fastened in the adjustable chuck or work holder of the machine, the thumb nut 33 and the thumb nut 28 are both loosened. The arm 22 is moved in the slot 31 until the ball 29 contacts with part of the work, such as the outer surface of a circular casting or the inner surface of an aperture to be rebored, whereupon the thumb nut 33 is tightened to fix the arm 22 with respect to the slot 31. The bell crank lever 9 is, during this adjustment held so that the end of lever 36 is on the mid-point of dial 42. The arm 23 is then moved into such position as will produce the desired tension in the spring 25 to keep the ball 29 bearing against the work. The thumb nut 28 is then tightened to fix the arm 23 in this position.

The spindle holding the shank 1 is now rotated, and as the ball 29 moves around in contact with the work surface, any eccentricity of said surface with respect to the axis of the spindle results in a movement of the ball 29 to or away from said axis. This movement is transmitted to arm 22, to lever 30, through bell crank lever 9, to rod 11, to collar 12, and thence to the lever 36 through the finger 35, giving on the dial 42 an indication of the amount by which the workpiece is off center. After the first indication, the workpiece may be readjusted and another indication read, until the workpiece is finally centered.

This tool being automatic in its action except for the initial adjustment of the tool in the machine, in combination with the fact that the indicating portion of the device remains stationary during the entire action, provides a simple, efficient means to indicate eccentricity of work in the holder or chuck, which indication can be read easily and conveniently any time and at all times during the operation of the device.

While I have indicated the several types of machines and work with which this tool is adapted to be used, it can be readily appreciated that many other types of work and machines are of such a nature as to permit of the use of this tool without necessitating any essential change in the tool which would depart from the spirit of my invention.

What I claim is:

A device for alining a workpiece with respect to an axis, which comprises a rotatable shaft having an inner bore alined coincident with the axis, a projecting arm on said shaft, resilient means connected to said arm to maintain it in contact with the surface of a workpiece, a pivoted lever having a slot therein, said arm being adjustable in said slot, a reciprocable rod within the bore of the shaft, operative connections between said lever and said rod, a collar on said shaft having a shoulder, said collar being pinned to said rod and adapted to have a sliding movement on said shaft, a lever having a projection thereon adapted to contact with said shoulder, and an indicating dial arranged adjacent the end of said lever.

ALFRED FELIX FERRAND.